J. T. DRUFVA.

PORTABLE ELECTRIC LIGHT.

APPLICATION FILED NOV. 8, 1920.

Reissued Dec. 20, 1921.

15,249.

Inventor:
JOHN T. DRUFVA,
By John H. Bruninga,
His Attorney.

UNITED STATES PATENT OFFICE.

JOHN T. DRUFVA, OF LONGMEADOW, MASSACHUSETTS, ASSIGNOR TO HENRY HYMAN & CO., INC., OF NEW YORK, N. Y., A CORPORATION OF NEW YORK.

PORTABLE ELECTRIC LIGHT.

15,249. Specification of Reissued Letters Patent. Reissued Dec. 20, 1921.

Original No. 1,287,262, dated December 10, 1918, Serial No. 226,583, filed April 4, 1918. Application for reissue filed November 8, 1920. Serial No. 422,738.

*To all whom it may concern:*

Be it known that I, JOHN T. DRUFVA, a citizen of the United States, and residing at Longmeadow, in the county of Hampden, in the State of Massachusetts, have invented the new and useful Improvement in Portable Electric Lights, of which the following is a specification.

This invention relates more particularly to the character of electric flash lights to be held in the hand and lighted, as occasion may require, by the manual movement of a slide applied upon the exterior casing of the device.

This invention resides more particularly in the novel means for completing the circuit through the lamp and battery, one contact spring operable either by the exterior slide or thumb piece or by the push button being adapted to complete such circuit in accordance with the character of light desired to be produced.

While the drawings show this invention in use with a flash light having a casing of insulating material, it can be applied just as well to lamps with metallic casings by making obvious modifications.

The invention will be fully understood from the detailed description hereinafter presented, reference being had to the accompanying drawings, in which.

Figure 1:
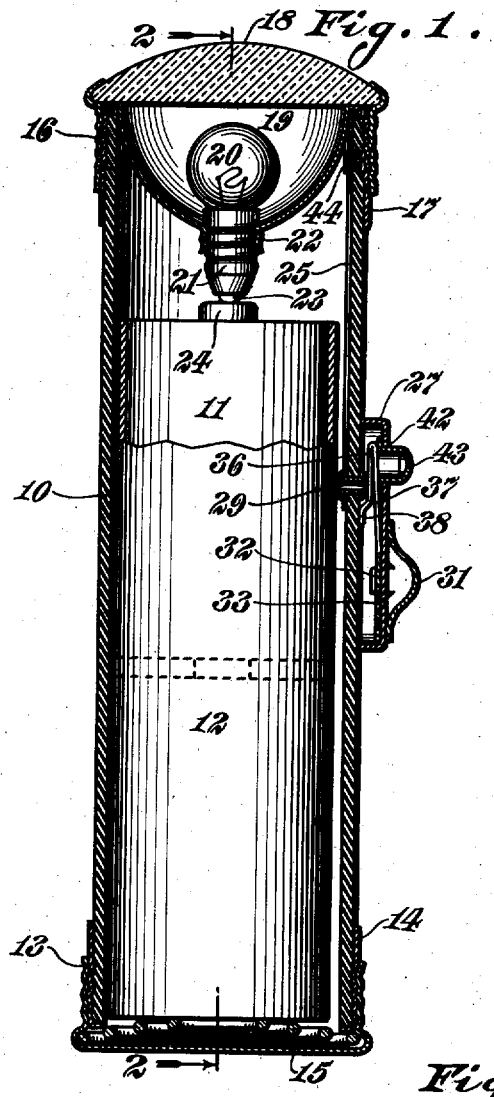
Figure 1 is a central longitudinal section, with the wrapping on the battery partly broken away, of a portable flash light embodying the invention, the casing of the flash light being shown in this instance as a fiber tube.
Figure 2:
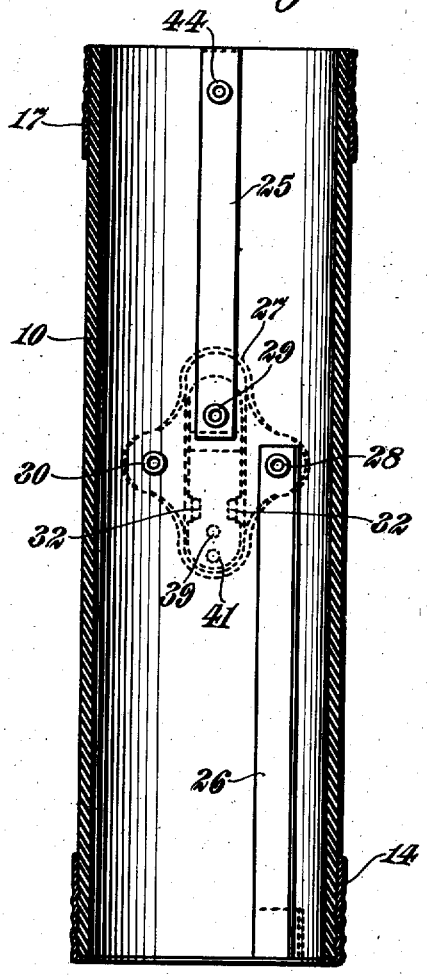
Fig. 2 is a central vertical section through the tubular portion of the flash light, taken on the dotted line 2—2 of Fig. 1.

In the drawings, 10 designates a tubular fiber or other insulating casing, 11 a plural cell battery therein, 12 a wrapping of insulating material on said battery, 13 a screw-cap of customary construction closing the lower end of said casing and engaging a metal sleeve 14 thereon, 15 a conducting spring compressed between the lower terminal of the battery and the inner surface of said cap, 16 a sleeve screwed upon a sleeve 17 fastened upon the outer end of said casing, 18 a customary lens held by said sleeve 16, 19 a reflector within the outer end of the casing 10, and 20 an electric bulb of known character having its terminal sleeve 22 at the inner end of said reflector, the other terminal 23 of the lamp being held in engagement with the upper terminal 24 of the battery by means of the spring 15.

Within the casing 10 are two normally separated conducting strips 25, 26, the lower end of the strip 26 being in electrical connection with the lower terminal of the battery, as usual, and the upper end of the strip 25 being carried upwardly to the upper edge of the casing 10 and in electrical connection with the reflector 19. The inner end of the strip 26 is secured to one wing of a metal escutcheon or housing 27 by an eyelet 28, which aids in securing the escutcheon upon the side of the casing 10, and said strip 26 is therefore in electrical connection with said escutcheon or housing. The inner end of the strip 25 is secured to the casing 10 by means of an eyelet 29 whose outer end is exposed within the escutcheon or housing 27 but is not normally in electrical connection therewith. The housing is rigidly secured in position upon the casing 10 by the aforesaid eyelet 28 and an additional eyelet 30.

In a metallic casing lamp the strip 26 would be dispensed with the strip 25 and the eyelet 29 would be insulated from the casing, and the eyelet 44 would be insulated from the strip 25.

Figure 3:
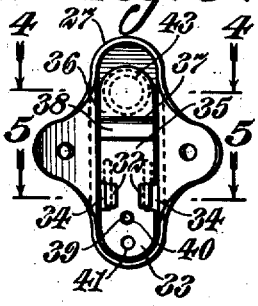
Fig. 3 is a detached inner face view of the housing or escutcheon applied to the exterior casing and containing the circuit making and breaking conductor spring.
Figure 4:
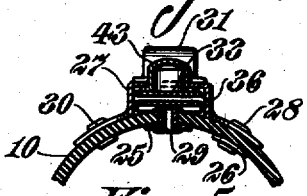
Fig. 4 is a transverse section through the same and a portion of the exterior casing of the flash light, taken on the dotted line 4—4, of Fig. 3.
Figure 5:
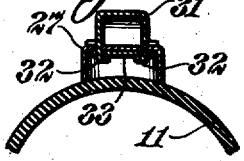
Fig. 5 is a similar section of the same, taken on the dotted line 5—5 of Fig. 3.
Figure 6:
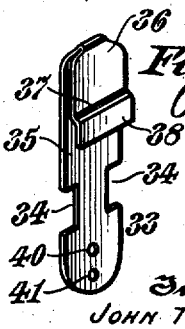
Fig. 6 is a detached perspective view on a larger scale of the contact element.

Upon the exterior flat face of the escutcheon or housing 27 is mounted a thumb-piece or slide 31 preferably formed from sheet metal and having, at opposite sides, tongues 32 which are inserted through slots in the escutcheon or housing 27 and bent toward each other, not only to secure the thumb-piece or slide in position, but also to embrace one portion of a conducting spring 33 which is confined within the escutcheon or housing 27 and recessed at opposite edges, as at 34, to admit the inner ends of the tongues 32. The spring 33 is, by means of the inwardly bent inner ends of the tongues 32, clamped against the inner face of the escutcheon or housing 27 but is movable with the thumb-piece or slide 31. The spring 33 is utilized to complete the circuit through the lamp and battery when moved into engagement with the eyelet 29, said spring normally being free of said eyelet, although at all times having its forward end over said eyelet. The spring 33 is of special construction, having a body portion 35 which lies flat against the inner wall of the escutcheon or housing 27, and an inner return or bent portion 36 which is over the eyelet 29 and possesses a shoulder 37 and a foot portion 38 which engages and may ride along the casing 10; and said portion 36 is preferably slightly spaced from the adjacent surface of the body 35 of the spring 33. The spring 33 has a direct sliding movement when actuated by the thumb-piece 31, and when moved forwardly the shoulder 37 thereon engages the eyelet 29 and completes the circuit. The spring 33 is yieldingly locked in its normal inoperative and its operative positions by means of a small stud 39 projecting inwardly from the escutcheon or housing 27 and adapted to receive one or the other of the two holes 40, 41 formed in the lower end of the spring 33. In Fig. 3, the hole 40 is being engaged by the stud 39, and when the thumb-piece 31 and spring 33 are slid forwardly, the hole 40 will be sprung from over the stud 39, and when the hole 41 reaches said stud it will snap upon the same. The lower end of the spring 33 is free to have limited spring movement toward and from the adjacent surfaces of the escutcheon or housing 27, and said end of the spring 33 having the holes 40, 41 coöperates with the stud 39 in forming a spring latch for yieldingly locking the spring 33 in either of its two positions.

The housing or escutcheon 27 is formed with an aperture 42 in which is movably mounted a push-button 43 whose inner edge is flanged so as to prevent the push-button from escaping from the escutcheon or housing 27, as shown in Fig. 1, and said edge of said push-button is against the upper end of the body of the spring 33. The upper portion of the spring 33 is always over or in line with the stud 29, and hence the push-button 43 may be employed to press the spring against the stud 29 for completing the circuit. The push-button 43 will be made use of when it is desired to flash the light, as in giving signals, whereas the slide or thumb-piece 31 will be employed to move the spring 33 into engagement with the stud 29 when it is desired to have a more or less permanent or steady light. The one spring 33 coöperates with both the thumb-piece or slide 31 and the push-button 43, so that the user of the device may at his option flash the light or have a permanent light.

The operation of the portable electrical light hereinbefore described will be understood without further detailed explanation.

It will be seen that the invention accomplishes its objects in that it provides novel means for completing the lamp circuit wherein the contact element may be moved to contacting engagement either by sliding, for duration lighting, or by flexure, for flash lighting, and that these movements are obtained by means of independent manipulative elements.

It is obvious that various changes may be made in the details of construction without departing from the spirit of this invention; it is, therefore, to be understood that this invention is not limited to the specific details shown and described.

Having thus described this invention, what is claimed is:

1. A circuit switch mechanism for a portable electric lamp, comprising, an escutcheon mounted on the lamp, a fixed contact, a coöperating movable contact member within said escutcheon, adapted to be moved either by simple sliding or by simple flexure to engage said fixed contact, and means for moving said member.

2. A circuit switch mechanism for a portable electric lamp, comprising, an escutcheon mounted on the lamp, a flexible contact member slidably mounted in said escutcheon, an element for sliding said member into contacting position, and an element for flexing said member into contacting position.

3. A circuit switch mechanism for a portable electric lamp, comprising, an escutcheon mounted on the lamp, a flexible contact member slidably mounted in said escutcheon, means for sliding said member into contacting position, and independent means for flexing said element into contacting position.

4. A circuit switch mechanism for a portable electric lamp, comprising, an escutcheon mounted on the lamp, a contact spring slidably mounted in said escutcheon, a thumb-piece for sliding said spring into contacting position, and a push button for flexing said spring into contacting position.

5. A circuit switch mechanism for a portable electric lamp, comprising, an escutcheon mounted on the lamp, a contact spring slidably mounted in said escutcheon, a thumb-piece for sliding said spring into contacting position, and a push button for flexing said spring into contacting position, said thumb-piece and said push button being operable independently of one another to move said spring.

6. A circuit closing switch mechanism for a portable electric lamp, comprising, an escutcheon mounted on the lamp, a fixed contact and a coöperating movable contact arranged wholly within said escutcheon, means for mounting said movable contact for sliding and depressing movements to engage said fixed contact, and means on said escutcheon for selectively shifting said contact.

7. A circuit closing switch mechanism for a portable electric lamp, comprising, an escutcheon mounted on said lamp, a fixed contact, and a movable element mounted on said escutcheon and having contacting portions adapted for simple sliding or butt contact engagements with said fixed contact when said element is slid or depressed respectively.

8. A circuit closing switch mechanism for a portable electric lamp, comprising, an escutcheon mounted on said lamp, a fixed contact, a movable element mounted on said escutcheon and having contacting portions adapted for simple sliding or butt contact engagements with said fixed contact when said element is slid or depressed, respectively, and manipulative means adapted for so selectively effecting such engagement.

9. A circuit closing switch mechanism for a portable electric lamp, comprising, an escutcheon mounted on said lamp, a fixed contact, and a movable element mounted on said escutcheon and having contacting portions adapted for simple sliding or pivotal engagements with said fixed contact when said element is slid or depressed respectively.

10. A circuit closing switch mechanism for a portable electric lamp, comprising, an escutcheon mounted on said lamp, a fixed contact, a movable element mounted on said escutcheon and having contacting portions adapted for sliding or pivotal engagement with said fixed contact, a thumb piece adapted for effecting said sliding engagement, and a push button for effecting said pivotal engagement.

11. A circuit switch-mechanism for portable electric lights comprising, in combination, a metal escutcheon having a thumb-piece slidably mounted on its outer face and a spring slidably mounted on its inner face and connected with said thumb-piece to slide therewith to circuit closing position, and a push-button mounted in said escutcheon independently of said thumb-piece and spring and in line with the free end of said spring and adapted when manually pressed inwardly to engage said end of said spring and flex the spring to circuit closing positions, said spring always being in position to be independently flexed by said push-button or slid by said thumb-piece, as occasion may require, to complete the circuit.

12. A circuit switch-mechanism for portable electric lights comprising, in combination, a metal escutcheon having a thumb-piece slidably mounted on its outer face and a spring slidably mounted on its inner face and connected with said thumb-piece to slide therewith to circuit closing position, and a push-button mounted in said escutcheon independently of said thumb-piece and spring and in line with the free end of said spring and adapted when manually pressed inwardly to engage said end of said spring and flex the spring to circuit closing position, said spring always being in position to be independently flexed by said push-button or slid by said thumb-piece, as occasion may require, to complete the circuit, and said escutcheon having a hole in which said push-button is freely movable and said push-button having at its inner edge a flange to prevent its escape outwardly from said hole.

13. A circuit switch-mechanism for portable electric lights comprising, in combination, a metal escutcheon having a thumb-piece slidably mounted on its outer face and a spring slidably mounted on its inner face and connected with said thumb-piece to slide therewith to circuit closing position, and a push-button mounted in said escutcheon independently of said thumb-piece and spring and in line with the free end of said spring and adapted when manually pressed inwardly to engage said end of said spring and flex the spring to circuit closing position, said spring always being in position to be independently flexed by said push-button or slid by said thumb-piece, as occasion may require, to complete the circuit, and said escutcheon having parallel guide slots in its outer face and said thumb-piece having side fingers extending inwardly through said slots and folded toward each other upon said spring for securing the same against the inner surface of the escutcheon, and said spring having recesses in its opposite edges to receive and interlock the spring with said fingers.

14. A circuit switch mechanism for portable electric lights comprising, in combination, a metal escutcheon having a thumb-piece slidably mounted on its outer face and a spring strip within said escutcheon and connected with said thumb-piece to slide therewith to circuit closing position and a push-button mounted in said escutcheon independently of said thumb-piece and in line with the free end of said spring and adapted when manually pressed inwardly to flex the spring to circuit closing position, said spring always being in position to be independently flexed by said push-button or slid by said thumb-piece, as occasion may require, to complete the circuit, and said spring having a body portion and a return inwardly bent portion having a shoulder to electrically connect with a circuit conductor, and said return bent portion being normally slightly separated from the body of said spring.

15. A circuit switch mechanism for portable electric lights comprising, in combination, a metal escutcheon having a thumb-piece slidably mounted on its outer face and a spring slidably mounted on its inner face and connected with said thumb-piece to slide therewith to circuit closing position, a push-button mounted in said escutcheon independently of said thumb-piece and in line with the free end of said spring and adapted when manually pressed inwardly to engage and flex the spring to circuit closing position, said spring being in position to be independently flexed by said push-button or slid by said thumb-piece, as occasion may require, to complete the circuit, and means for yieldingly locking said spring in its inoperative and operative positions, comprising a stud extending inwardly from said escutcheon, and holes provided in said spring to engage said stud in the respective positions of said spring.

16. A circuit switch mechanism for portable electric lights comprising, in combination, an escutcheon having a thumb-piece slidably mounted on its outer face and a spring slidably mounted within the escutcheon and connected to said thumb-piece to slide therewith to circuit closing position, and a push-button mounted in said escutcheon independently of said thumb-piece and in line with the free end of said spring and adapted when manually pressed inwardly to flex the spring to circuit closing position, said spring always being in position to be independently flexed by said push-button or slid by said thumb-piece, as occasion may require, to complete the circuit.

17. A circuit switch mechanism for a portable electric lamp, comprising, an escutcheon mounted on the lamp, a flexible contact member slidably mounted in said escutcheon, a thumb piece connected to said member and adapted to slide the same to contacting position, and a push-button adapted to flex said member to contacting position.

Signed at New York, New York, this 15th day of April, 1920.

JOHN T. DRUFVA.